United States Patent [19]

Fraser

[11] Patent Number: 5,620,061

[45] Date of Patent: Apr. 15, 1997

[54] CHECKOUT COUNTER ADVERTISING DISPLAY

[76] Inventor: William A. Fraser, 3001 Audubon Ter. NW., Washington, D.C. 20098

[21] Appl. No.: 682,052

[22] Filed: Jul. 16, 1996

Related U.S. Application Data

[63] Continuation of Ser. No. 518,346, Aug. 23, 1995, abandoned.

[51] Int. Cl.$^6$ .............................. A47F 10/02; G09F 11/12
[52] U.S. Cl. ........................... 186/68; 40/472; 198/502.1
[58] Field of Search ................................ 186/38, 49, 52, 186/55, 59, 61, 68, 69; 198/502.1; 40/158.1, 472, 661; 312/117, 118, 134

[56] References Cited

U.S. PATENT DOCUMENTS

| | | | |
|---|---|---|---|
| 826,720 | 7/1906 | George | 312/117 |
| 1,027,811 | 5/1912 | Brock | 40/528 X |
| 1,189,137 | 6/1916 | Klingelhofer | 312/134 X |
| 3,949,194 | 4/1976 | Catto et al. | 198/340 X |
| 4,979,591 | 12/1990 | Habegger et al. | 186/68 |
| 5,165,526 | 11/1992 | Conklin, Jr. . | |
| 5,183,142 | 2/1993 | Latchinian et al. | 186/56 X |
| 5,248,536 | 9/1993 | Dukatz | 40/661 X |
| 5,358,094 | 10/1994 | Molinaro et al. | 186/68 X |
| 5,450,926 | 9/1995 | Fraser | 186/59 |

Primary Examiner—F. J. Bartuska
Attorney, Agent, or Firm—Thomas A. Powers; Chandrakant C. Shroff

[57] ABSTRACT

A checkout counter advertising display includes visible information containing for example an advertisement displayed through a transparent or translucent portion of a countertop of the checkout counter. A customer can signal an operator at the checkout counter that he/she wants to buy merchandise advertised in the display. The signalling can be performed orally or visually, or by activating a signalling device on the countertop.

44 Claims, 2 Drawing Sheets

CHECKOUT COUNTER ADVERTISING DISPLAY

This is a Continuation-in-Part of application Ser. No. 08/518,346 filed on Aug. 23, 1995, now abandoned.

FIELD OF INVENTION

The present invention relates generally to an apparatus for and method of purchasing products from a checkout counter and, more particularly, to such a method and apparatus wherein an advertisement of a product is viewed through a transparent or translucent counter. In a preferred embodiment, a customer signals, orally, visually or mechanically, that he/she is desirous of purchasing the product advertised. Optionally, the counter may include a transparent or translucent conveyor belt.

BACKGROUND ART

Checkout counters are widely used in certain types of retail establishments, such as supermarkets and in stores of certain mass merchandisers. A typical checkout counter includes a cash register and a conveyor belt for merchandise to be purchased. Articles to be purchased are loaded, usually by customers, on the conveyor belt and transported from a position remote from the cash register toward a cash register operator. During busier times, while an order of a first customer is being processed by the cash register operator, another order is loaded on the conveyor belt at a position remote from the operator and cash register. Frequently, more than one order is loaded onto the conveyor belt by two or more customers, while the first customer is being "checked out." To distinguish the orders of different customers, an order divider bar, located in proximity to the conveyor belt, is inserted by the customers between the items forming the different orders. After a customer has been checked out, the divider bar is returned, usually by the checkout counter operator, toward the rear of a track adjacent the conveyor belt, so that the next customer can reach the divider bar.

In my prior co-pending patent application, Ser. No. 08/385,518, filed Feb. 2, 1995, entitled CHECKOUT COUNTER ORDER DIVIDER INCLUDING MERCHANDISE TO BE PURCHASED now U.S. Pat. No. 5,450,926, the contents of which is hereby incorporated by reference, there is disclosed an order divider including merchandise that can be bought by the customer. The merchandise or an advertisement for it can be seen by the customer.

In other types of retail establishments, where customers typically shop for smaller orders than at supermarkets, there is no need for conveyor belts. Often, a simple counter is used, and the customer stands near the counter and places the order on the counter in the vicinity of a checkout counter operator.

A conveyor belt for a grocery store counter is disclosed in U.S. Pat. No. 5,358,084, issued on Oct. 25, 1994 to Molinaro for "Conveyor Belt With Advertisements." Vinyl sheets made of a static cling material having advertising indicia imprinted thereon adhere to a conveyor belt top surface by electrostatic cling. In one embodiment, strips of a releasable adhesive material, preferably located at a leading edge of the vinyl sheet, secure the vinyl sheets to the conveyor belt. In another embodiment, the surface of the vinyl sheet is treated with a slip agent to prevent merchandise from adhering to the vinyl sheets.

In U.S. Pat. No. 4,979,591 issued on Dec. 25, 1990 to Habegger et al. for "Conveyor Belt," advertising indicia are imprinted directly on a visible outer surface of a conveyor belt, whereupon the conveyor belt is coated with a clear layer of protective plastic material.

Another prior art conveyor belt containing advertising indicia is disclosed in U.S. Pat. No. 5,165,526, issued on Nov. 24, 1992 to Conklin, Jr. for "Conveyor System with Panels Containing Visual Information." A conveyor belt, preferably a baggage carousel, includes a plurality of transparent panels, each having a thin layer containing visual information affixed to its bottom surface. To enhance the visibility of the panels, back lighting is used, resulting in an increased intensity to the colors.

It is an object of the present invention to provide a new and improved method of and apparatus for facilitating and encouraging purchase of items at a checkout counter.

An additional object of the invention is to provide a new and improved checkout counter, wherein an advertisement is displayed on the counter.

An additional object of the invention is to provide a new and improved checkout counter, wherein the counter includes a structure for signalling that items therein are to be purchased.

Yet another object of the invention is to provide a new and improved conveyor belt-type checkout counter, wherein an advertisement is displayed on the counter and viewed through the conveyor belt.

SUMMARY OF THE INVENTION

I have realized that a checkout counter can serve as a point of purchase advertisement, such that advertisements are visible under a transparent or translucent counter. If a customer desires to purchase the product advertised at the checkout counter, he/she signals this fact to the operator orally or visually or by activating certain devices included in the counter. Because the prospective purchaser sees the advertisement at the point of purchase, he/she is quite likely to buy the merchandise. If the present invention is used with an order divider bar of the type disclosed in my co-pending application, there is a double inducement to buy the merchandise.

Such a counter can be used in either counter situation described above. For instance, in stores using a simple counter, the counter may be formed of a transparent or translucent countertop through which images are viewed. Rather than being transparent or translucent, the countertop may have apertures through which a display device can be viewed. Such apertures may be sized and shaped for exposing a video display or projection screen, for example, which may be arranged at or near the top of the counter. An aperture may also take the shape of an elongated slot extending longitudinally beneath the conveyor belt. Further, the counter may be completely open and uncovered. The counter can be adapted for use in retail establishments utilizing a counter with a conveyor belt by forming the counter of a transparent or translucent material, with a transparent or translucent conveyor belt over the counter. Thus, the image is viewed through the counter and the transparent or translucent conveyor belt.

More specifically, the present invention is directed to a method of checking out from a checkout counter including a countertop that is at least partially optically transparent to optical energy on which articles of an order can be placed. The method includes displaying visible indicia containing an advertisement of at least one merchandise article available to be purchased therein through the transparent countertop. In a preferred embodiment, the method further includes signalling that the at least one merchandise article displayed in the indicia is to be purchased.

According to another aspect, a checkout counter advertising display is described. A checkout counter is provided including a countertop that is at least partially optically transparent to optical energy. The counter may be open, or have a completely transparent or translucent countertop, or a countertop with transparent or translucent windows, slots or other types of openings for displaying such visible indicia. Such visible indicia may be displayed on a video display or projection screen, for example, arranged at or near the top of the counter. In each case, the images may be viewed through a substantially transparent conveyor belt. A means for positioning a visible indicia containing an advertisement beneath the countertop is provided. The checkout counter and positioning means is positioned and arranged so a customer can view the indicia through the countertop.

According to yet another aspect, a checkout counter advertising display is described. A checkout counter is provided including a countertop that is at least partially optically transparent to optical energy. A means for projecting visible indicia containing an advertisement to the countertop is provided. The checkout counter and projecting means is positioned and arranged so a customer can view the indicia through the countertop.

The above and still further objects, features and advantages of the present invention will become apparent upon consideration of the following detailed description of several specific embodiments thereof, especially when taken in conjunction with the accompanying drawings.

DESCRIPTION OF THE PREFERRED EMBODIMENTS

Figure 1:
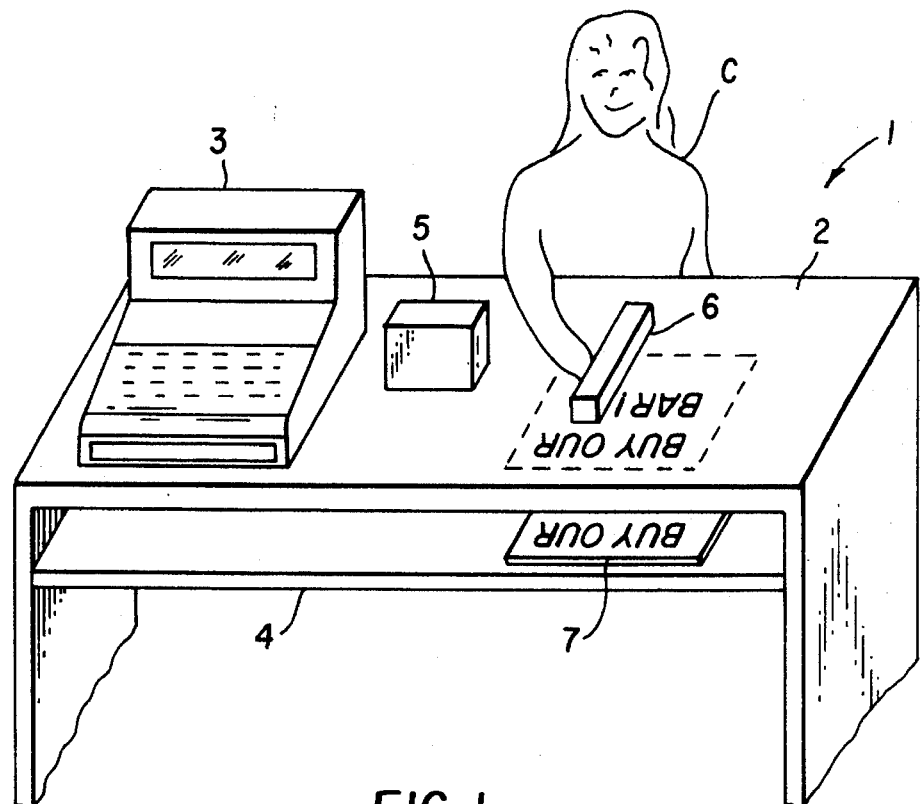
FIG. 1 is a schematic perspective view of a preferred embodiment of a checkout counter, in accordance with the present invention.

Reference is now made to FIG. 1 of the drawing, a schematic view of checkout counter 1 including countertop 2 and cash register 3. Positioning means, such as receptacle 4 is disposed beneath the countertop 2. Orders 5 and 6 are placed on countertop 2 in the vicinity of cash register 3.

In the embodiment of FIG. 1, countertop 2 is at least partially optically transparent to optical energy. For instance, countertop 2 may be made of a transparent material. Changeable visual indicia containing an advertisement to a customer of the establishment is placed in receptacle 4 by the operator of checkout counter 1 or some other employee of the establishment where counter 1 is located or a representative of the advertised goods. Preferably, access to receptacle 4 for removal and reinsertion of advertising material is available on a side of the counter near the cashier. Visible indicia 7 may take several forms. For instance, the visible indicia 7 may be neon tubing having an advertising message, a video screen responsive to a video signal, a fiber optic display having an advertising message, or printed sheet formed of paper or a transparent material.

Because the visible indicia containing an advertisement is visible through transparent countertop 2, customer C at checkout counter 1 is likely to be induced into purchasing the advertised item or items viewed at receptacle 4. This is particularly true since customer C places his/her order directly on countertop 2. Should customer C desire to purchase the item or items advertised, customer C signals to a checkout counter operator working at register 3 that the items are to be purchased. Such signalling can be accomplished by oral or visual communication between customer C and the checkout counter operator, or by customer C by activating various signalling devices mounted on countertop 2, or by customer C by activating various signalling devices mounted on an order divider bar, as described in my co-pending application Ser. No. 08/385,518, infra. In response to customer C signalling to the checkout counter operator that the merchandise advertised in receptacle 4 is to be purchased, the checkout counter operator locates the merchandise stored at a convenient location near counter 1, and activates cash register 3 in a normal manner. Alternatively, if the merchandise is in the order divider, that merchandise is removed from the order divider or the order divider becomes part of the customer's order.

Figure 2:
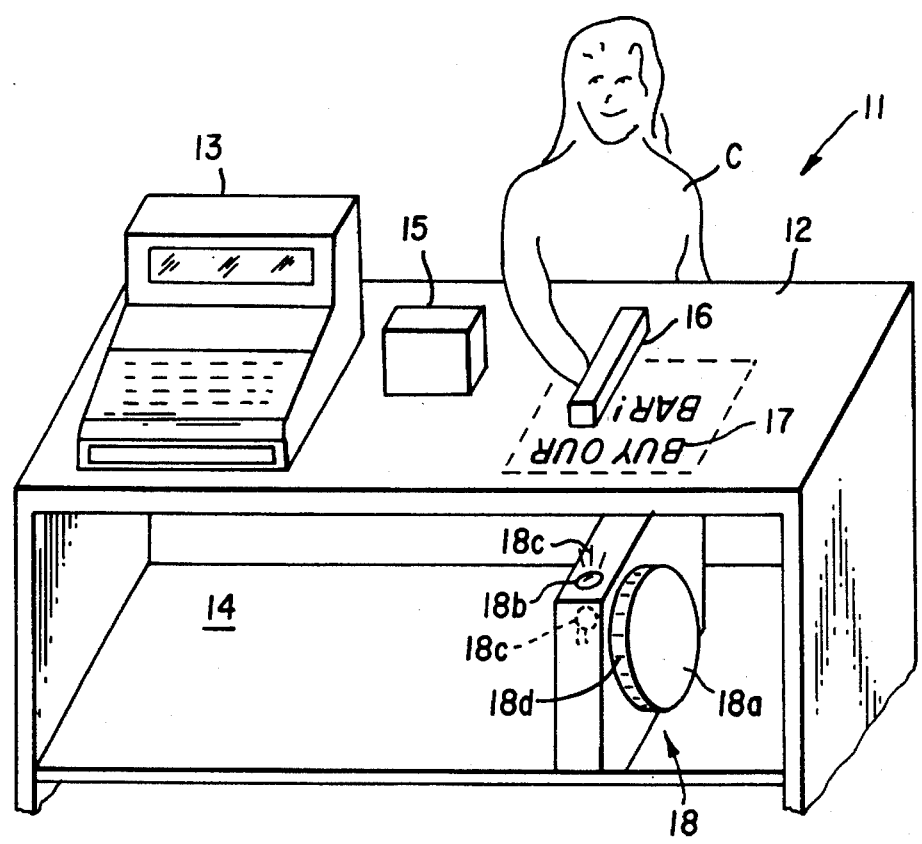
FIG. 2 is a schematic perspective view of another embodiment of a checkout in accordance with the present invention.

In a second embodiment of the counter, illustrated in FIG. 2, checkout counter 11 includes countertop 12 and cash register 13. A shelf or receptacle 14 is disposed beneath the countertop 12. Orders 15 and 16 are placed on countertop 12 in the vicinity of cash register 13 and separated by an order divider.

As in the embodiment of FIG. 1, countertop 12 is at least partially optically transparent to optical energy. Preferably, countertop 12 is made of a translucent material, such as glass or plastic. A optical image 17 of a visible indicia containing an advertisement is projected onto translucent countertop 12 using a projecting means 18 disposed in receptacle 14. As in the first embodiment, access to receptacle 14 preferably is available on the side of the counter near the cashier. As depicted in FIG. 2, image 17 is a slide image projected by slide projector 18 to the underside of counter top 12. Projector 18 includes a slide carousel 18a containing optical slides 18d carrying advertisements, lens 18b and lamp 18e that illuminates the lens so an image of the slide between the light source and lens is projected onto countertop 12. Carousel 18a may be rotated from time to time so different products are advertised on countertop 12 toward which light rays 18c are emitted. Alternate embodiments for projecting image 17 onto the backside of countertop 12 include a motion picture camera and a video projection source. There are numerous other possibilities for projecting an advertisement onto countertop 12 within the scope of the present invention.

Because the visible indicia containing an advertisement is visible through the translucent countertop 12, customer C at checkout counter 11 is likely to decide that he/she desires to purchase the item or items advertised by image 17, in which case customer C signals to a checkout counter operator working at register 13 that the items are to be purchased. The cashier then locates the merchandise and activates the cash register 13. Such signalling can be accomplished by the purchaser verbally telling the operator of his/her desire to purchase the merchandise or the purchaser merely pointing to the merchandise. Alternatively, counter 2 or 12 can include various aural and/or visual signalling devices, to be described in conjunction with FIGS. 4–5.

Figure 3:
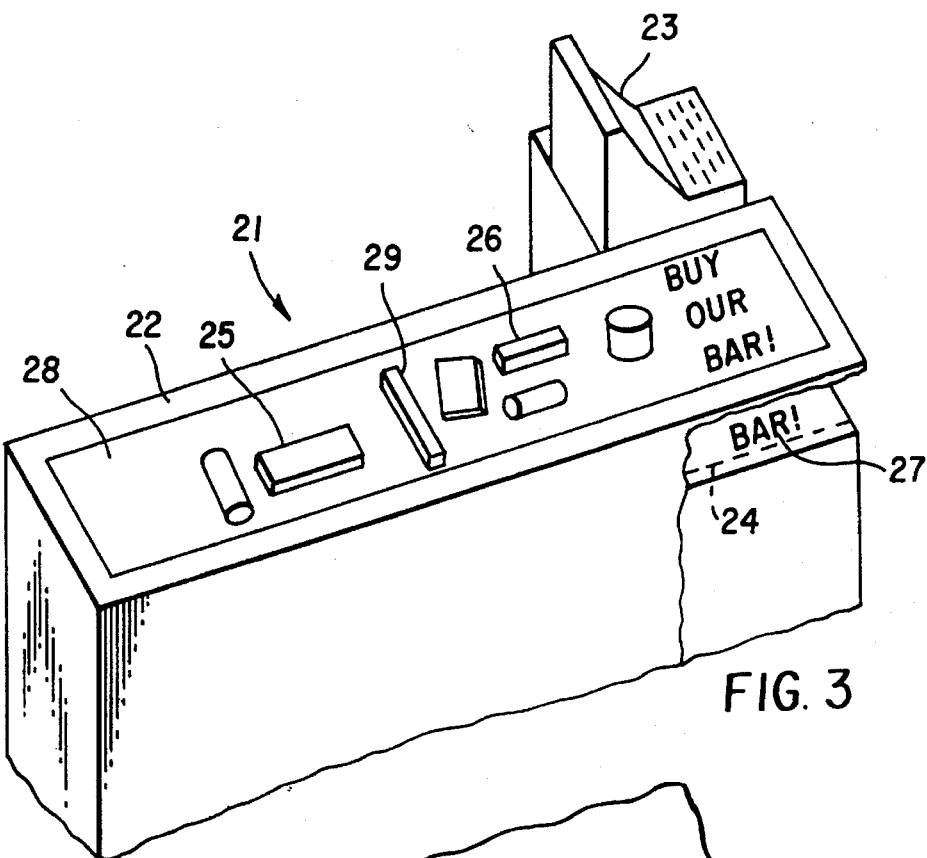
FIG. 3 is a schematic perspective view of third embodiment of a checkout in accordance with the present invention.

In a further embodiment illustrated in FIG. 3, checkout counter 21 includes transparent countertop 22, cash register 23, and transparent conveyor belt 28. Positioning means, such as receptacle 24, is disposed beneath countertop 22. Orders 25 and 26, placed on conveyor belt 28, are separated by order divider bar 29, preferably containing an advertisement and/or the advertised merchandise as described in my co-depending application, Ser. No. 08/385,518, filed Feb. 2, 1995, entitled CHECKOUT COUNTER ORDER DIVIDER INCLUDING MERCHANDISE TO BE PURCHASED, incorporated herein by reference.

As in the FIG. 1 embodiment, countertop 22 is of a transparent material. The countertop 22 may be fully or partially open. Visible indicia 27, similar to indicia 7 and 17, as described in the embodiment of FIGS. 1 or 2, is placed in receptacle 24. The indicia 27 may be generated by a video monitor or other display device which may be arranged at or near the countertop for being viewed through the transparent conveyor belt 28. Access to receptacle 24 is available near the cashier. Advertising media 27 is viewed through transparent countertop 22 and transparent conveyor belt 28. The embodiment of FIG. 2 may be modified in a like manner so as to provide a translucent countertop through which a projected advertisement is viewed. The embodiment of FIG. 2 may also be modified in a like manner so as to provide a transparent countertop through which a projected advertisement may be projected onto a translucent conveyor belt.

Figure 4:
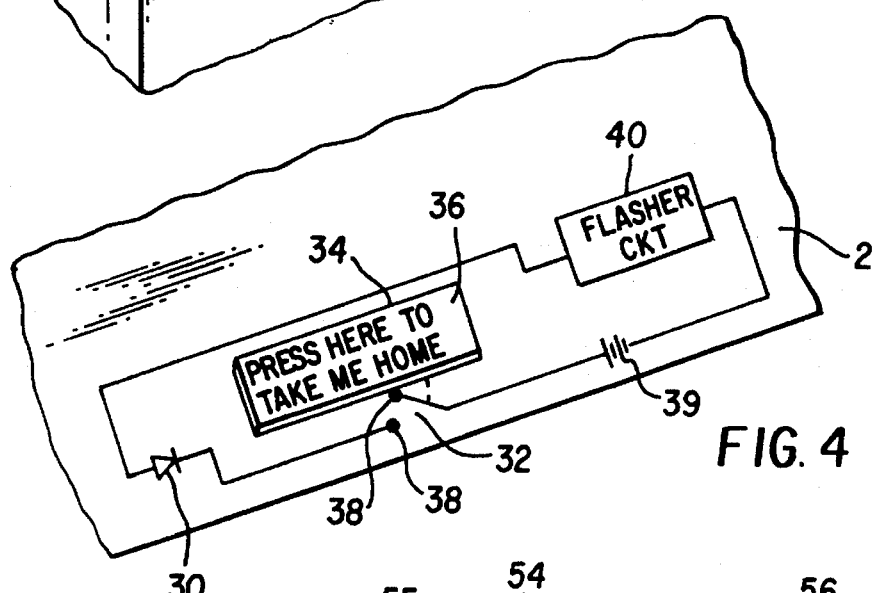
FIG. 4 is a perspective view of a modification of the embodiments of FIGS. 1, 2 and 3, wherein the counter includes an electrically activated visual signalling device.

In the embodiment of FIG. 4, the countertop 2, 12 and 22 in the embodiments of FIGS. 1, 2 and 3 is modified so counters 1, 11 and 21 have embedded therein an electric circuit including light source 30, in the form of a light emitting diode (LED), in combination with, for instance, pressure responsive switch 32 having normally open contacts 38. Other alternatives include a mechanical switch, such as a toggle, or any suitable physical action causing a pair of switch contacts to close, resulting in a completed circuit. Preferably, in this embodiment, the visible indicia include a phrase such as "TO TAKE ME HOME, PRESS THE BUTTON." Immediately above pressure responsive switch 32 is indicia bearing strip 34 stating, for example, "IF YOU WANT TO TAKE HOME WHAT YOU SEE IN THE AD, PRESS HERE," or other suitable indicia to advise the prospective purchaser that the strip should be pressed downwardly. Strip 34 is mounted on flexible plate 36, which, when pushed, closes electrical contacts 38, in series with light emitting diode 30, as well as flasher circuit 40 and battery 39 that are part of the circuit embedded in the checkout counter. Thereby, in response to plate 36 being pushed downwardly toward receptacle 4, 14 or 24, LED 30 is periodically turned on and off, i.e., "flashes." It is to be understood that flasher circuit 40 can be replaced by a circuit that constantly energizes diode 30 for a sufficient period, e.g. 30 seconds, to get the attention of the checkout operator. A flashlight bulb can be used as the light source in lieu of light emitting diode 30. The light source is preferably located underneath the counter and when energized shines through the countertop to give an effect such as a shining or winking eye.

Alternately, the customer may perform a physical action that causes a pair of switch contacts to close, and provide an aural or other message to the checkout counter operator that the customer desires to purchase the advertised goods. An actuator for such contacts is preferably permanently mounted on the countertop; a pressure responsive switch, similar to switch 32, FIG. 4, is particularly advantageous. As a further alternative, the countertop may include a permanent magnet switch contact that is closed in response to the purchaser rubbing ferrous material, e.g. keys, against any of countertops 2, 12 or 22. The customer is instructed to perform such rubbing by a written instruction on the countertop.

Figure 5:
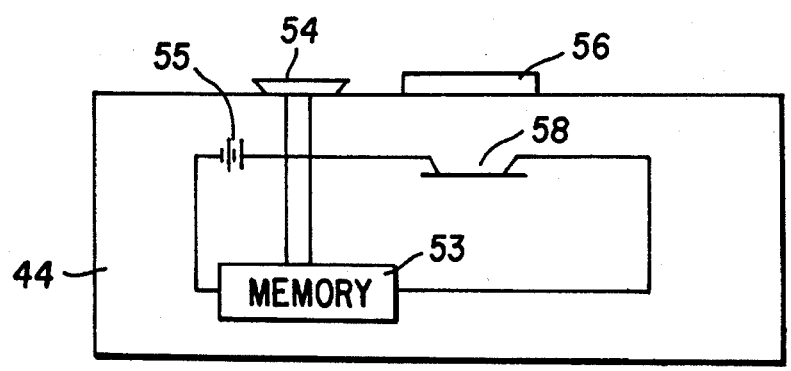
FIG. 5 is a schematic view of a further embodiment wherein a voice synthesizer is activated in response to energization of a light detector.

According to another embodiment, schematically illustrated in FIG. 5, any of countertops 2, 12 or 22 is modified to include tab 56 that covers normally reverse biased phototransistor 58 and normally prevents ambient optical energy from being incident on the phototransistor since the tab is opaque to optical energy. When tab 56 is pulled upwardly, phototransistor 58 is exposed to ambient light energy and becomes forward biased. Thereby, memory 53 is connected to battery 55 by forward biased phototransistor 58, to activate a speaker 54. Alternatively, phototransistor 58 can be normally covered by an adhesively removable strip (not shown) which is pulled from the counter when a checking out customer C desires to purchase the advertised merchandise. The visual signalling device of FIG. 4 can be combined with the switching device of FIG. 5.

It can be seen by one of ordinary skill in the art that the visual indicia may be any one or more of the following: neon tubing, a video screen, a fiber optic display, printed sheets formed of paper, paperboard cardboard, or other similar materials, or transparencies, and images projected from a slide projector or a motion picture projector. It will be understood that some of these visual indicia are more appropriate for transparent countertops, while others are more appropriate for translucent countertops. Yet another embodiment includes positioning a living entity in the receptacle. For instance, a pet store owner or operator might place a live rabbit or rabbits in the receptacle to stimulate sales.

Various adaptations to the present invention have been contemplated, all which are deemed to be within the scope of this invention. For instance, a protective, disposable layer of glass or transparent plastic may be provided on the top of the countertop to protect the countertop from scratches and other damage. Alternatively, the countertop may be solid and include a transparent or translucent insert, which is replaced when scratched or otherwise damaged. Such an insert may vary in dimensions, from, for instance, 6"×6" to 24"×72" or larger. In the embodiments wherein the advertisement is projected onto the countertop, there may be provided a means for supplying electric power to the projector. A sound recognition device can also activate the projection device in response to the customer or checkout counter operator enunciating a particular word or phrase. In such an event, the customer is prompted to respond orally. The sound recognition device recognizes the word or phrase to cause the advertising media to be displayed.

It thus can be seen that the primary benefit of the invention is to increase sales of a retail establishment where the counter is located, by virtue of a person moving through a checkout counter responding to impulse buying psychology.

While there have been described and illustrated several specific embodiments of the invention, it will be clear that variations in the details of the embodiments specifically illustrated and described may be made without departing from the true spirit and scope of the invention as defined in the appended claims.

I claim:

1. A method of displaying visual information at a checkout counter including a countertop having therein a display surface that is at least partially optically translucent to optical energy, comprising the steps of:
   (a) arranging below said countertop a device capable of projecting an optical image of said visual information onto said display surface associated with the countertop; and
   (b) projecting said optical image onto said surface of the countertop.

2. The method of claim 1 further including the step of providing a device for signalling that at least one merchandise article displayed in the visual information is to be purchased.

3. The method of claim 2 wherein the signalling is performed aurally.

4. The method of claim 2 wherein the signalling is performed aurally by activating a sound source at the counter.

5. The method of claim 2 wherein the signalling is performed visually.

6. The method of claim 2 wherein the signalling is performed visually by activating a light emitter at the counter.

7. A checkout counter display comprising:
   a checkout counter including a countertop having therein a display surface that is at least partially optically translucent to optical energy;
   a projector capable of projecting an optical image of visual information onto said display surface, the projector being disposed beneath the countertop and projecting the image upwardly so that the projected image of said visual information may be viewed on said translucent display surface from above said countertop.

8. The display of claim 7, wherein said display surface is a translucent portion of a conveyor belt which is movable along the countertop.

9. The display of claim 7, wherein the projector is capable of projecting said optical image from a slide.

10. The display of claim 7, wherein the projector is capable of projecting said optical image from a video source.

11. The display of claim 7, wherein the projector is capable of projecting said optical image from a motion picture film.

12. The display of claim 7, wherein the projector is capable of projecting said optical image from printed material printed on a transparency.

13. The display of claim 7, wherein said visual information is an advertisement for at least one merchandise article, and further comprising a signal device disposed on the counter for signalling that the at least one merchandise article is desired to be purchased.

14. The display of claim 13, wherein the countertop has integrally mounted thereon a signal device for visually signalling that the at least one merchandise article is desired to be purchased.

15. The display of claim 13, wherein the signal device includes a light source.

16. The display of claim 15, wherein the light source includes an electrically activated light emitter, and further including an electric circuit on the countertop for activating the light emitter, the electric circuit including a switch for being activated in response to manual activity being applied to a structure on the countertop.

17. The display of claim 13, wherein the countertop has integrally mounted thereon a device for signalling that the at least one merchandise article is desired to be purchased, the device including a switch for being activated in response to manual activity being applied to a structure on the countertop.

18. The display of claim 17, wherein the structure on the countertop is pressure responsive and is deflected toward the interior of the countertop in response to the manual activity, the switch including normally open contacts that are closed in response to the pressure responsive structure being deflected toward the interior of the countertop.

19. The display of claim 17, wherein the electric device includes a light emitter and a circuit for successively activating the light emitter to on and off states.

20. The display of claim 17, wherein the electric device includes an aural source.

21. The display of claim 20, wherein the aural source includes a voice synthesizer.

22. The display of claim 8, wherein the countertop beneath said conveyor belt and above said projector is transparent.

23. The display of claim 7, wherein said display surface is a portion of said countertop which is translucent.

24. The display of claim 23, wherein the translucent portion is made of glass.

25. The display of claim 23, wherein the translucent portion is made of plastic.

26. The display of claim 23, further comprising a transparent conveyor belt which is movable over said translucent portion of said countertop.

27. The display of claim 7, wherein said projector has a projection lens for projecting said image onto said display surface.

28. The display of claim 7, wherein the countertop above said projector is transparent.

29. The display of claim 10, wherein said video source is a television display.

30. The display of claim 10, wherein said video source is a video recording playback device.

31. The display of claim 9, wherein said projector has a projection lens for projecting said image onto said display surface.

32. The display of claim 10, wherein said projector has a projection lens for projecting said image onto said display surface.

33. The display of claim 11, wherein said projector has a projection lens for projecting said image onto said display surface.

34. The display of claim 12, wherein said projector has a projection lens for projecting said image onto said display surface.

35. The display of claim 29, wherein said projector has a projection lens for projecting said image onto said display surface.

36. The display of claim 30, wherein said projector has a projection lens for projecting said image onto said display surface.

37. A method of displaying visual information at a checkout counter where articles may be purchased, said method comprising the steps of:
   a) providing a horizontal checkout counter having a display surface, said display surface being immobile;
   b) displaying visual information on the display surface of the checkout counter; and
   c) providing a substantially transparent conveyer above the display surface of the checkout counter, said conveyer being adapted to convey articles along the display surface of the checkout counter;

wherein said visual information may be viewed through he conveyer.

38. The method of claim 37, wherein said display surface is display screen of a video monitor.

39. The method of claim 38, wherein said display surface is viewed through an opening in the horizontal checkout counter.

40. The method of claim 38, wherein said horizontal checkout counter is substantially transparent; and said display surface is viewable through the horizontal checkout counter.

41. An apparatus for displaying visual information at a checkout counter, comprising:

a) a horizontal checkout counter having a display surface, said display surface being immobile b) means for displaying visual information on the display surface of the checkout counter; and c) a substantially transparent conveyer above the display surface of the checkout counter, said conveyer being adapted to convey articles along the display surface of the checkout counter;

wherein said visual information is viewable through the conveyer.

42. The apparatus of claim 41, wherein said display surface is a display screen of a video monitor.

43. The method of claim 42, wherein said display surface is viewable through an opening in the horizontal checkout counter.

44. The method of claim 42, wherein said horizontal checkout counter is substantially transparent, and said display surface is viewable through the horizontal checkout counter.

* * * * *